United States Patent [19]

McCartney

[11] Patent Number: 5,137,395

[45] Date of Patent: Aug. 11, 1992

[54] DYNAMIC EARTH ANCHOR, AND A SLEEVE THEREFOR

[75] Inventor: Clifford A. McCartney, Salem, Va.

[73] Assignee: Ingersoll-Rand Company, Woodcliff Lake, N.J.

[21] Appl. No.: 684,473

[22] Filed: Apr. 11, 1991

Related U.S. Application Data

[63] Continuation of Ser. No. 511,911, Apr. 23, 1990, abandoned, which is a continuation of Ser. No. 388,410, Aug. 2, 1989, abandoned.

[51] Int. Cl.$^5$ .................. E21D 21/00; E21D 20/00; F16B 13/06
[52] U.S. Cl. .................. 405/259.3; 411/44; 411/60; 411/62; 411/69
[58] Field of Search .............. 405/251, 259-261, 405/259.1, 259.3; 411/61, 62, 60, 69, 82, 16, 32, 44, 72, 73

[56] References Cited

U.S. PATENT DOCUMENTS

| | | | |
|---|---|---|---|
| Re. 32,645 | 4/1988 | Scott | 405/259 |
| 1,229,287 | 6/1917 | Kennedy | 411/69 |
| 1,438,855 | 12/1922 | Rawlings | 411/69 |
| 2,024,064 | 12/1935 | Schaefer | 411/62 |
| 4,218,954 | 8/1980 | Morel | 411/44 X |
| 4,430,025 | 2/1984 | Ciavatta | 405/261 |
| 4,474,516 | 10/1984 | Schiefer | 411/44 |
| 4,475,856 | 10/1984 | Toomingas | 405/259 X |
| 4,650,373 | 3/1987 | Seegmiller | 405/260 |
| 4,659,258 | 4/1987 | Scott | 405/261 |
| 4,836,729 | 6/1989 | Bisping et al. | 405/260 X |

*Primary Examiner*—Randolph A. Reese
*Assistant Examiner*—John A. Ricci
*Attorney, Agent, or Firm*—John J. Selko; Glenn B. Foster

[57] ABSTRACT

An apparatus comprising a sleeve insertable into a borehole, the borehole having a first diameter. A roof pin is inserted into the sleeve, the roof pin having a second outer diameter which is less than the first diameter. The outer surface has a peripheral dimension prior to insertion of the sleeve into the borehole. The inner or the outer surface contains at least one longitudinally extending yieldable channel portion which is of a lesser sleeve thickness than the remainder of the sleeve, permitting circumferential expansion of the sleeve. Expansion of the sleeve establishes a restraint between the roof pin and the borehole. When the sleeve is expanded within the borehole, continuous peripheral contact is made between the outer surface and the borehole.

5 Claims, 2 Drawing Sheets

DYNAMIC EARTH ANCHOR, AND A SLEEVE THEREFOR

This application is a continuation of application Ser. No. 07/511,911, filed Apr. 23, 1990 now abandoned, which is a continuation of application Ser. No. 07,388,410 filed Aug. 2, 1989 now abandoned.

BACKGROUND OF THE INVENTION

This invention pertains to dynamic earth anchors, or rock stabilizing fixtures, as the same are also identified, and in particular to such earth anchor so conceived as to facilitate either the insertion of a rock bolt-receiving sleeve into the terrestrial formation borehole, or the insertion of the rock bolt into the sleeve, as well as to sleeves of and for such earth anchors.

Dynamic earth anchors, or rock stabilizing fixtures, are well known. Exemplary thereof is the "Dynamic Rock Stabilizing Fixture" set forth the Reissue U.S. Pat. No. 32645 and issued to James J. Scott.

The fixture in the aforesaid patent comprises a sleeve having a hollow body which is inserted into the end of a terrestrial borehole, and a rock bolt which is then inserted into the borehole-seated sleeve. Typically, the bolt will have threads or other disruptions on the surface thereof to enhance its fast engagement with the sleeve. The combination sets up an almost immediate restraint of the terrestrial formation, and accommodates a roof plate, or the like, at the formation face.

Due to discontinuities and/or asperities in the sleeve-receiving borehole, it is frequently difficult to set the sleeve into the termination of the borehole; too, difficulties are commonly encountered in inserting the rock bolt into the seated sleeve.

The foregoing illustrates limitations known to exist in present devices. Thus, it is apparent that it would be advantageous to provide an alternative directed to overcoming one or more of the limitations set forth above. Accordingly, a suitable alternative is provided including features more fully described hereinafter.

SUMMARY OF THE INVENTION

In one aspect of the instant invention, this is accomplished by providing an apparatus comprising a sleeve insertable into a borehole, the borehole having a first diameter. A roof pin is inserted into the sleeve, the roof pin having a second outer diameter which is less than the first diameter. The outer surface has a peripheral dimension prior to insertion of the sleeve into the borehole. The inner or the outer surface contains at least one longitudinally extending yieldable channel portion which is of a lesser sleeve thickness than the remainder of the sleeve, permitting circumferential expansion of the sleeve. Expansion of the sleeve establishes a restraint between the roof pin and the borehole.

BRIEF DESCRIPTION OF THE DRAWING FIGURES

Figure 5:
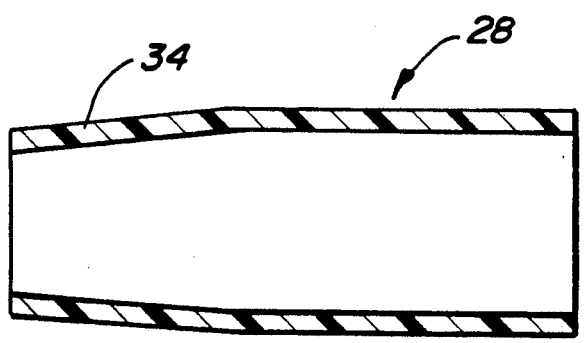
Figure 6:
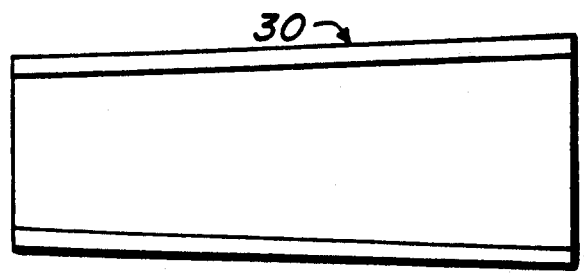
Figure 7:
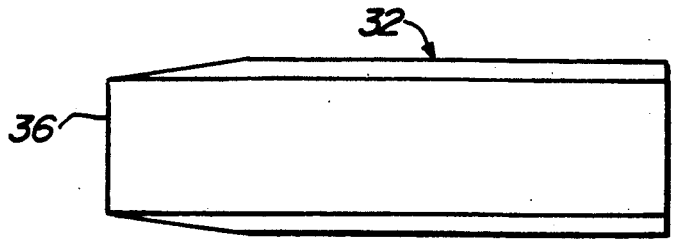
Figure 8:
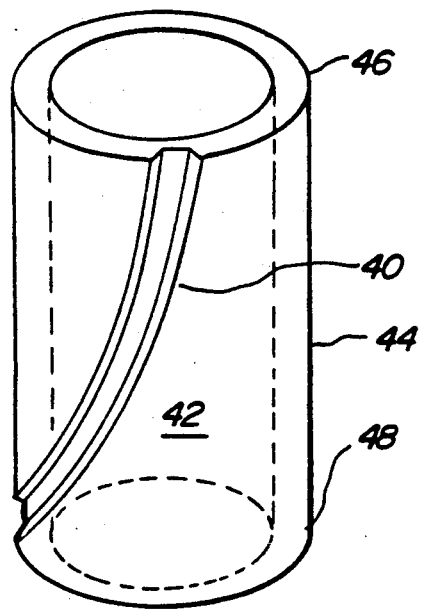

FIGS. 5, 6, and 7 are longitudinal cross-sectional views of further embodiments of the sleeve of the invention; and FIG. 8 illustrates a channel spirally disposed along the elongated outer surface of the sleeve body.

DETAILED DESCRIPTION

Figure 1:
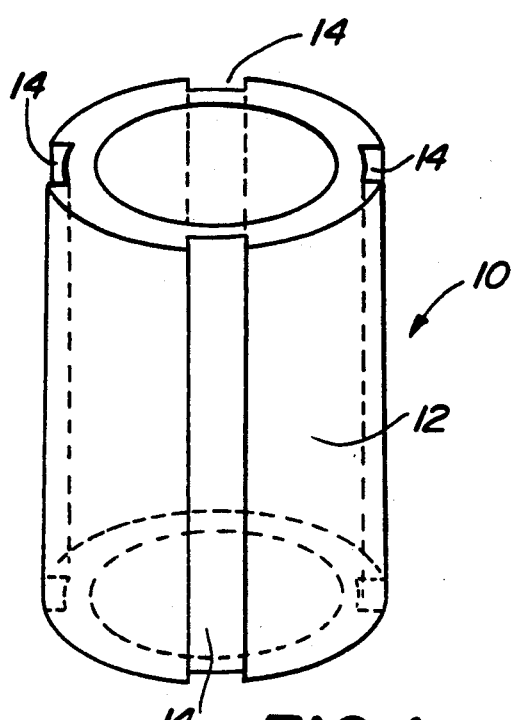
FIG. 1 is a perspective illustration of a first embodiment of the novel sleeve.
Figure 2:
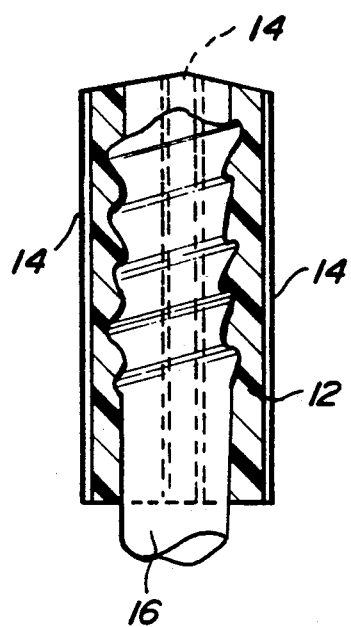
FIG. 2 is a depiction of the leading end of a threaded roof bolt made fast in the sleeve of FIG. 1, the same comprising an embodiment of the novel dynamic earth anchor.

As shown in FIG. 1, a sleeve 10, according to this embodiment thereof, comprises a body 12 which is hollow, defining the same as an endless wall. The body is formed of a deformable plastic material, and has four, equally-spaced apart channels 14 formed in the outer surface thereof. Now, the outer diameter of the sleeve 10 is substantially identical to that of the borehole into which it is to be inserted, and the inside diameter thereof is smaller than the greatest outside diameter of the roof bolt or rock bolt which is to be inserted into the sleeve. (For the purposes of this disclosure, roof bolt and rock bolt will be used interchangeably, as they mean the same thing.) Clearly, it requires some reasonable force to get the leading end of a roof bolt fully inserted into the undersized sleeve 10. Consequently, to minimize the force required, the channels 14 are provided as yieldable portions of the sleeve 10 which can splay and widen, while inserting roof bolt, to make bolt entry easier to accomplish. As shown in FIG. 2, the roof bolt 16 has been inserted in the sleeve 10, with the channels expanded to facilitate its insertion therein.

Figure 3:
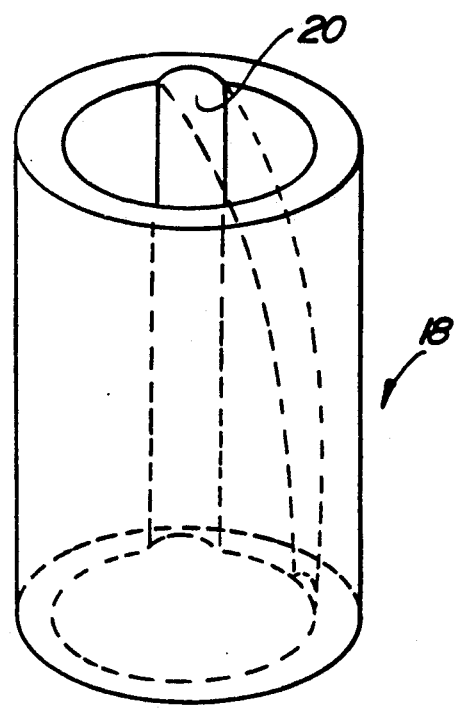
FIG. 3 is a perspective illustration of a second embodiment of the novel sleeve.
Figure 4:
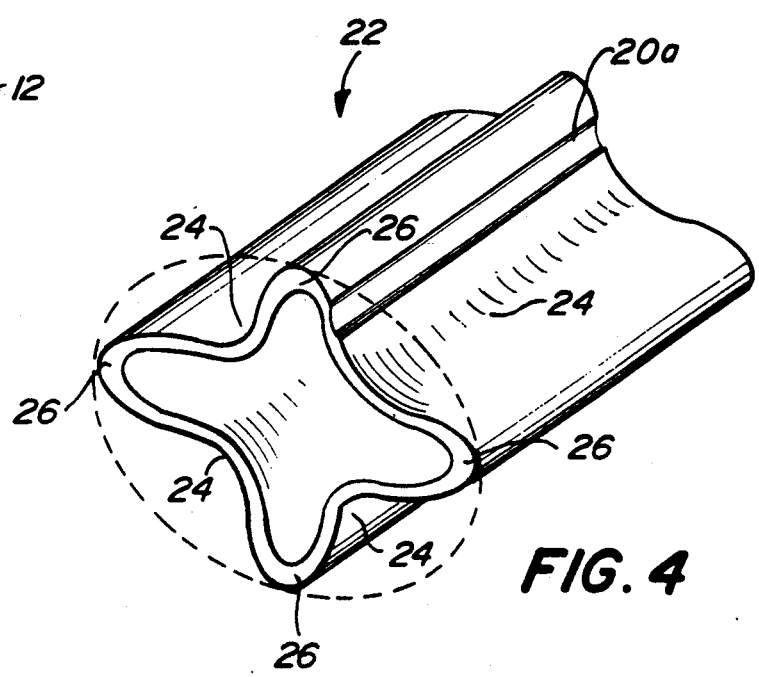
FIG. 4 is a perspective depiction of a third embodiment of the inventive sleeve.

The sleeve of FIG. 3 is a alternative embodiment in which there is but a single yieldable channel 20, and here the latter is formed in the inner surface of the sleeve.

Where the embodiments of FIGS. 1 through 3 depicted sleeves 10 and 18 configured to facilitate the entry of the roof bolt, pin 16 thereinto, FIG. 4 shows an embodiment of a sleeve 22 which has an overall, outermost dimension which is smaller than the diameter of the borehole into which it is to be inserted. This embodiment is set forth to facilitate the entry of the sleeve 22 into the borehole without undue difficulty. The borehole is represented by the dashed outline, and the sleeve 22, of a substantially cruciform shape, is somewhat collapsed. The flutes or depressions 24 located between the lobes 26 will expand, upon the insertion of a roof bolt thereinto, and the sleeve 22 will assume a circular shape and be pressed firmly into the wall of the borehole. This embodiment may also include a channel 20a.

FIGS. 5, 6 and 7 show, in longitudinal cross-section, further embodiments of sleeves 28, 30, 32, respectively, which are configured to facilitate their entry into a borehole. Sleeve 28 has a tapered front or leading end 34. Sleeve 30 has a taper running the fully length thereof, with the narrowest portion being at the leading end, i.e., the bore entry end, thereof. Sleeve 32 is similar to sleeve 28; it is tapered only at the leading end thereof. In addition, however, sleeve 32 has a knife edge 36 at the termination of the taper. This offers a particular advantage. Frequently, such sleeves used in dynamic earth anchors are grouted in place. To this end, a cartridge of grout is placed in the borehole in advance of the sleeve. The knife edge 36 of sleeve 32 will, when forced into the borehole, following the insertion of a cartridge of grout, rupture the grout cartridge, and permit the grout to flow.

Reverting to the sleeve 10, of FIG. 1, and having remarked about the use of grout, it is to be noted that the channels 14 will also serve as conduits for the flow of the fluid grout along the length of the sleeve 10. Therefore, as required in the circumstances, sleeve 10 can be modified to incorporate a knife edge (such as 36 of sleeve 32), or sleeve 32 could be formed with channels (such as those in sleeve 10). These, and all other embodiments and modifications of the novel sleeves, and the dynamic earth anchor (FIG. 2) of which they are component parts, are deemed to be prefigured by this disclosure, and embraced by the appended claims.

As a further alternative, FIG. 8 illustrates a spirally disposed channel 40 formed to extend along an outer surface 42 of body 44. Channel 40 extends substantially between a first end 46 and a second end 48 of body 44. Also, in FIG. 3, it is illustrated in dotted line, that channel 20 can be spirally disposed along an inner surface of sleeve 18.

Accordingly, while I have described my invention in connection with specific embodiments thereof, it is to be clearly understood that this is done only by way of example and not as a limitation to the scope of my invention, as set forth in the appended claims.

What is claimed is:

1. An apparatus comprising:
   a sleeve insertable into a borehole, the borehole having an inner diameter;
   a roof pin to be inserted into the sleeve, the roof pin having an outer diameter which is less than the borehole inner diameter;
   the sleeve having a continuous, circumferential outer surface without any structural interruptions, the outer surface having a uniform sleeve outer diameter equal to or smaller than said borehole inner diameter after insertion of the sleeve into the borehole and prior to insertion of the roof pin into the sleeve; and
   said sleeve having an inner surface containing at least one longitudinally extending yieldable channel portion which has a lesser thickness than the remainder of the sleeve, sufficient circumferential expansion of the channel portions permitting circumferential expansion of said sleeve to establish a restraint between the roof pin and the borehole.

2. The apparatus as described in claim 1, wherein said sleeve has a longitudinal axis, and the channel extends substantially parallel to the longitudinal axis.

3. The apparatus as described in claim 1, wherein said sleeve has a first and a second axial end, and the channel extends spirally between the first and the second axial end.

4. An apparatus comprising:
   a sleeve insertable into a borehole, the borehole having an inner diameter, the sleeve, when undeformed, having an outer diameter equal to or smaller than the borehole inner diameter;
   a roof pin to be inserted into the sleeve, the roof pin having an outer diameter which is less than the borehole inner diameter;
   the sleeve having a continous, circumferential inner surface without any structural interruptions, the inner surface having a uniform sleeve inner diameter after insertion of the sleeve into the borehole and prior to insertion of the roof pin into the sleeve;
   the sleeve having an outer surface containing at least one longitudinally extending yieldable channel portion which has a lesser thickness than the remainder of the sleeve, sufficient circumferential expansion of the channel portions permitting circumferential expansion of the sleeve to establish a restraint between the roof pin and the borehole; and
   the sleeve having a first and a second axial end, and the channel extending spirally between the first and the second axial ends of the sleeve.

5. An anchor for stabilizing a terrestrial formation comprising:
   a sleeve insertable into a borehole formed in the terrestrial formation, the borehole having an inner diameter, the sleeve, when undeformed, having an outer diameter equal to or smaller than said inner diameter;
   a pin insertable into the sleeve, the pin having an outer diameter less than the borehole inner diameter;
   said sleeve having a substantially cylindrical continuous peripheral outer surface and an inner surface;
   said peripheral outer surface having a substantially constant sleeve outer diameter after insertion of the sleeve into the borehole and prior to insertion of the pin into the sleeve; and
   said inner surface having a longitudinally extending yieldable channel portion with a lesser sleeve thickness than the remainder of the sleeve, sufficient circumferential expansion of the channel portions permitting radial expansion of the sleeve outer diameter upon insertion of the pin into the sleeve to establish anchoring between the sleeve and the borehole.

* * * * *